(Model.)
F. W. CHASE.
Cigar Cutter.
No. 240,574.  Patented April 26, 1881.
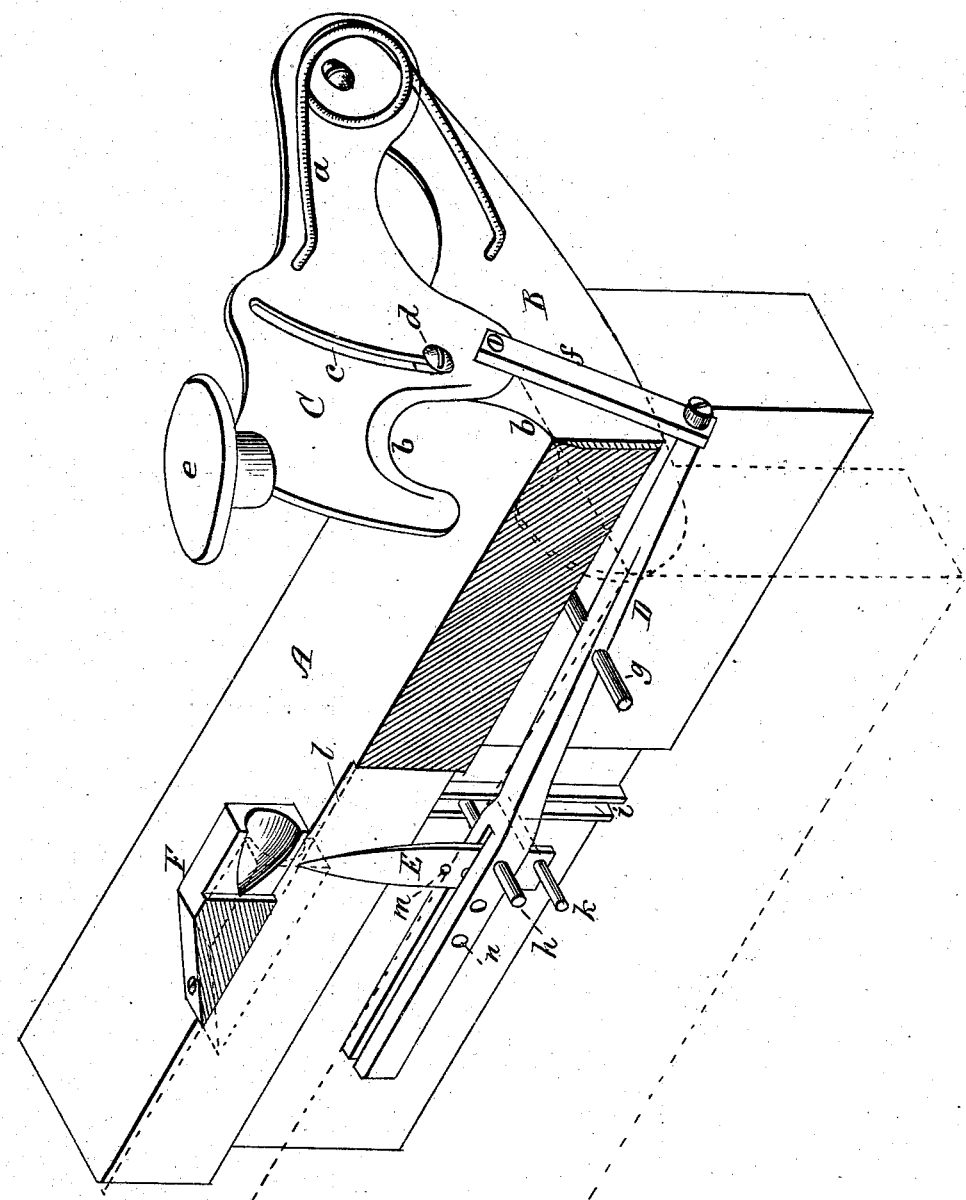
Witnesses:
H. C. McArthur
W. C. Chaffee
Inventor
Frank W. Chase
per Chas. H. Fowler
Attorney.

UNITED STATES PATENT OFFICE.

FRANK W. CHASE, OF LAWRENCE, MASSACHUSETTS.

CIGAR-CUTTER.

SPECIFICATION forming part of Letters Patent No. 240,574, dated April 26, 1881.

Application filed February 28, 1881. (Model.)

*To all whom it may concern:*

Be it known that I, FRANK W. CHASE, a citizen of the United States, residing at Lawrence, in the county of Essex and State of Massachusetts, have invented certain new and useful Improvements in Cigar-Cutters; and I do hereby declare that the following is a full, clear, and exact description of the same, reference being had to the annexed drawing, making a part of this specification, and to the letters and figures of reference marked thereon.

The present invention has relation to certain new and useful improvements in machines for trimming the ends of cigars. When cigars become very dry, if the smaller end thereof is not slit or punctured the wrapper will become broken or unwind when the smoker bites or cuts off the end.

The cutting and trimming of the larger end or tuck of the cigar and the puncturing or slitting or splitting of the smaller end have been accomplished by two entirely separate and distinct devices.

It is the object of the present invention to combine these two devices in one and the same machine, whereby the cigar when trimmed at its larger end or tuck the smaller end is simultaneously being split or punctured. This object I attain by the construction substantially as shown in the drawings and hereinafter described.

In the accompanying drawing, which represents a perspective view of my invention, partly in section, A is the base of the machine, to which the several operating parts are connected.

The device which cuts and trims the larger end of the cigar may be of the ordinary construction; but in order to illustrate the combination of the two devices I have shown a cutter most generally in use, consisting of the blade B, rigidly secured to the end of the base A, and having pivoted an upper blade, C, a suitable spring, a, being connected to the blades, in order to throw the blade C up after being depressed. Each blade has a semicircular cutting-edge, b, and the upper blade, C, has an elongated slot, c, through which a guide-pin, d, passes to guide the blade in its movement when pressed down by the handle e.

To the blade C is pivoted one end of a bar, f, the opposite end being pivoted to a lever, D. This lever D is arranged within a recess under the base A, and is pivoted thereto by a pin, g, passing through the sides of the base and through the lever. The free end of the lever D is bifurcated to receive the lower end of a knife, E, said knife being held therein by pin h passing through the bifurcated end of the lever and the knife and projecting beyond the sides sufficiently to enter groove i. A second pin, k, may be used to guide the knife E, and the pin h simply used as a means for connecting the knife to the bifurcated end of the lever. This knife E passes up through a slot, l, in the base A, the point entering a cap, F, said cap receiving the end of the cigar and protecting it as it is split or punctured by the knife E.

The cigar, after coming from the mold or ready to be trimmed, is placed on the base A with its large end or tuck in contact with the blade B and its smaller end within the cap F. In this position the cigar is ready to be operated upon by the machine, and by giving the handle e a sharp blow with the hand the blade C, with its cutting edge, is brought down upon the end or tuck of the cigar, which cuts and trims it perfectly even. As this operation is going on the opposite end of the cigar is being split or punctured in the following manner: The blade C, when forced down by its connecting-bar f, forces down the end of the lever D, the bifurated end of the lever at the same time being forced in an upward direction, and the knife E, connected thereto, is carried upward, the point passing through the slot l and piercing or slitting the end of the cigar. The knife E is vertically and longitudinally adjustable by holes m in the knife and holes n in the bifurcated end of the lever; also, the cap F is adjustable lengthwise of the base A, to accommodate the machine to the various sizes of cigars, both in length and thickness. This adjustment of the cap F may be obtained by a set-screw passing through the rear portion of the cap, or by any other desirable means found best adapted to the purpose.

Having now fully described my invention, what I claim as new, and desire to secure by Letters Patent, is—

1. A device for cutting or trimming the large end or tuck of a cigar, and a device for piercing, splitting, or puncturing the smaller end thereof, said devices being connected together by mechanism substantially as shown and described, whereby the two ends of the cigar are operated upon simultaneously, for the purpose set forth.

2. The combination, with a suitable device for cutting or trimming the larger ends or tucks of cigars, of the lever D, carrying knife E, substantially as and for the purpose set forth.

3. In a machine for cutting and trimming cigars, the combination, with the cap F, of the knives C E, connected together by mechanism substantially as shown and described, whereby the two ends of the cigar are simultaneously operated upon, substantially as and for the purpose set forth.

In testimony that I claim the above I have hereunto subscribed my name in the presence of two witnesses.

FRANK W. CHASE.

Witnesses:
WILLIAM E. HEALD,
MOSES H. AMES.